3,230,266
PREPARATION OF PHLOROGLUCINOL
Andrew A. Baldoni, Crystal Lake, and James Miyashiro, Woodstock, Ill., assignors, by mesne assignments, to Morton International, Inc., a corporation of Delaware
No Drawing. Filed Nov. 17, 1961, Ser. No. 153,228
8 Claims. (Cl. 260—621)

This invention relates to the production of symmetrical trihydroxybenzene. More particularly, the invention relates to a process of producing the symmetrical 1,3,5-trihydroxybenzene compound commonly known as phloroglucinol.

The commercial value of phloroglucinol dictates that economical and efficient methods be provided for producing it in relatively large amounts. The present invention provides a process whereby phloroglucinol can be effectively and economically prepared in a simple manner using readily available production equipment. Moreover, the starting materials employed in the present process are relatively low cost chemical by-products, whereas the product phloroglucinol is a relatively costly chemical having various uses.

According to the present invention phloroglucinol is prepared from 1,2,3,5-tetrahalobenzene compounds by treating said tetrahalobenzene compounds with ammonia in the presence of a specified catalyst followed by hydrolysis of the intermediate product resulting from the ammonolysis reaction.

A variety of tetrahalobenzene compounds can be used as the starting material in the process of the instant invention including 1,2,3,5-tetrabromobenzene, 1,2,3,5-tetraiodobenzene and 1,2,3,5-tetrachlorobenzene. Mixed tetrahalobenzene compounds such as, for example, 2,4,6-tribromochlorobenzene can also be used. The 1,2,3,5-tetrahalobenzene compounds from any suitable source can be employed.

The tetrahalobenzene starting materials are reacted with ammonia at a temperature from about 200 to about 240° C., and preferably from 210 to 220° C. Temperatures appreciably above about 240° C. often result in considerable charring of the product with consequent reduction in yield and are therefore to be avoided. The ammonolysis reaction can be advantageously carried out under pressure such as in an autoclave operating at pressures from about 700 to 1500 pounds per square inch or more.

A considerable excess of ammonia is used in the ammonolysis reaction with the amount of ammonia employed being preferably between about 5 and 10 moles of ammonia for each halogen atom in the tetrahalobenzene starting material. The ammonia is preferably employed in aqueous solution since anhydrous ammonia reacts more slowly with the tetrahalobenzene compounds. The concentration of ammonia in the aqueous solution is not important and the commonly available ammonium hydroxide solutions containing about 28% ammonia are eminently satisfactory.

The reaction of the tetrahalobenzene compound with the ammonia is carried out in the presence of a catalyst selected from the group consisting of cuprous chloride, cuprous bromide, cuprous iodide and cuprous oxide. The catalyst is employed in an amount ranging from about 0.10 gram to about 10.0 grams or more for each halogen atom in the tetrahalobenzene compound.

Reaction of the tetrahalobenzene compounds with ammonia under the specified conditions results in the production of an amino substituted benzene compound, the identity of which is not defintely known nor need it be as far as operativeness of the process is concerned. Coupling tests, however, carried out with diazo coated paper and the reaction intermediate, indicates the presence of symtriamino-benzene. This intermediate product in aqueous solution is acidified to a low pH and then hydrolyzed at elevated temperatures to produce the desired phloroglucinol product. Hydrolysis of the intermediate product is carried out at a pH of about 0.0 to 3.0 and preferably at a pH from 0.0 to 1.0. Various temperatures and pressures may be utilized to achieve hydrolysis as is known in the art. Preferably hydrolysis is carried out at temperatures of 100° C. and above.

The method of preparing phloroglucinol according to the process of the present invention is further illustrated by the following examples which are not to be construed as limitative thereof. The quantities of reactants are in parts by weight unless otherwise indicated.

Example I

A 1-liter autoclave equipped with agitator, cooling and heating jacket was charged with 63 grams (0.29 mole) of 1,2,3,5-tetrachlorobenzene, 700 mls. (10 moles) of 28% aqueous ammonia and 20 grams of cuprous chloride. The reaction mixture was then heated with agitation to a temperature of approximately 230–240° C. under a pressure of about 1,225 p.s.i. for a period of 1.25 hours.

The autoclave was then cooled to room temperature and vented. The contents were neutralized with sodium hydroxide and distilled to remove the excess ammonia. The stripped distillation liquors were filtered to eliminate the insoluble copper salt, acidified to a pH of 0.1 with sulfuric acid and then refluxed for a period of 16 hours.

The reaction mixture after being cooled and extracted with diethyl ether yielded anhydrous phloroglucinol having a melting point of 216–219° C.

Example II

A 1-liter autoclave was charged with 104 grams (0.48 mole) of 1,2,3,5-tetrachlorobenzene, 700 mls. (10 moles) of 28% aqueous ammonia and 10 grams of cuprous chloride. The contents were heated to a temperature of about 200 to 219° C. for a period of four hours. The reaction mixture, after being treated in the same manner as described in Example I, yielded anhydrous phloroglucinol.

Example III

A 1-liter autoclave was charged with 82.5 grams (0.236 mole) of 2,4,6-tribromochlorobenzene, 700 (10 moles) of 28% aqueous ammonia and 2.5 grams of cuprous chloride. The contents were heated with agitation to a temperature of 220° C. for ½ hour.

The autoclave was then cooled to room temperature and vented. The contents were neutralized with sodium hydroxide and distilled to remove the excess ammonia. The stripped distillation liquors were filtered to eliminate the insoluble copper salt, acidified to a pH of 0.1 with sulfuric acid and then refluxed for a period of 16 hours.

The reaction mixture after being cooled and extracted with diethyl ether yielded anhydrous phloroglucinol having a melting point of 216–219° C.

The process of the present invention as described in detail herein provides a convenient and highly advantageous method for preparing pholorglucinol, a material having many commercial uses such as in the photographic developing art and so forth.

Those modifications and equivalents which fall within the spirit of the invention and the scope of the appended claims are to be considered part of the invention.

We claim:
1. A process for preparing pholoroglucinol which comprises reacting a 1,2,3,5-tetrahalobenzene with aqueous ammonia in the presence of a catalyst selected from the group consisting of cuprous chloride, cuprous bromide, cuprous iodide and cuprous oxide, then adjusting the acidity of the reaction mixture to a pH of not more than about 3, heating the reaction mixture to effect hydrolysis and recovering phloroglucinol from the hydrolysate.

2. A process for preparing phloroglucinol which comprises reacting a 1,2,3,5-tetrahalobenzene with aqueous ammonia at a temperature in the range from about 200 to 240° C. in the presence of a catalyst selected from the group consisting of cuprous chloride, cuprous bromide, cuprous iodide and cuprous oxide, then adjusting the acidity of the reaction mixture to a pH of not more than about 3, heating the reaction mixture to effect hydrolysis and recovering phloroglucinol from the hydrolysate.

3. A process for preparing phloroglucinol which comprises reacting a 1,2,3,5-tetrahalobenzene with aqueous ammonia at a temperature in the range from about 200 to 240° C. in the presence of a catalyst selected from the group consisting of cuprous chloride, cuprous bromide, cuprous iodide and cuprous oxide, then adjusting the acidity of the reaction mixture to a pH from about 0.0 to 1.0 and heating the reaction mixture to effect hydrolysis and recovering phloroglucinal from the hydrolysate.

4. The process of claim 3 wherein the ammonia is employed in an amount ranging from about 5 to 10 moles of ammonia for each halogen atom in the tetrahalobenzene compound.

5. The process of claim 3 wherein the tetrahalobenzene is a compound containing different halogen atoms.

6. The process of claim 3 wherein the tetrahalobenzene is tetrachlorobenzene.

7. The process of claim 3 wherein the tetrahalobenzene is tetrabromobenzene.

8. The process of claim 3 wherein the tetrahalobenzene is tetraiodobenzene.

References Cited by the Examiner
UNITED STATES PATENTS

| | | | |
|---|---|---|---|
| 1,726,171 | 8/1929 | Williams et al. | 260—581 |
| 2,614,126 | 10/1952 | Krueger | 260—621 |
| 3,057,922 | 10/1962 | Luvisi et al. | 260—581 |

LEON ZITVER, *Primary Examiner.*

CHARLES B. PARKER, *Examiner.*